June 21, 1966  L. O. DOWNES  3,256,668
PARTITIONS WITH PANELS SECURED TO FRAMING
MEMBERS BY RESILIENT CLIPS
Filed Oct. 1, 1962  5 Sheets-Sheet 1
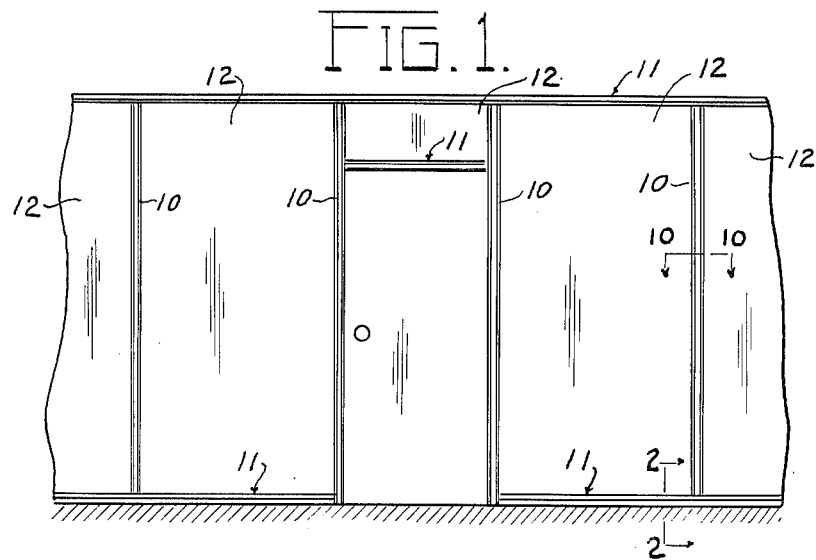
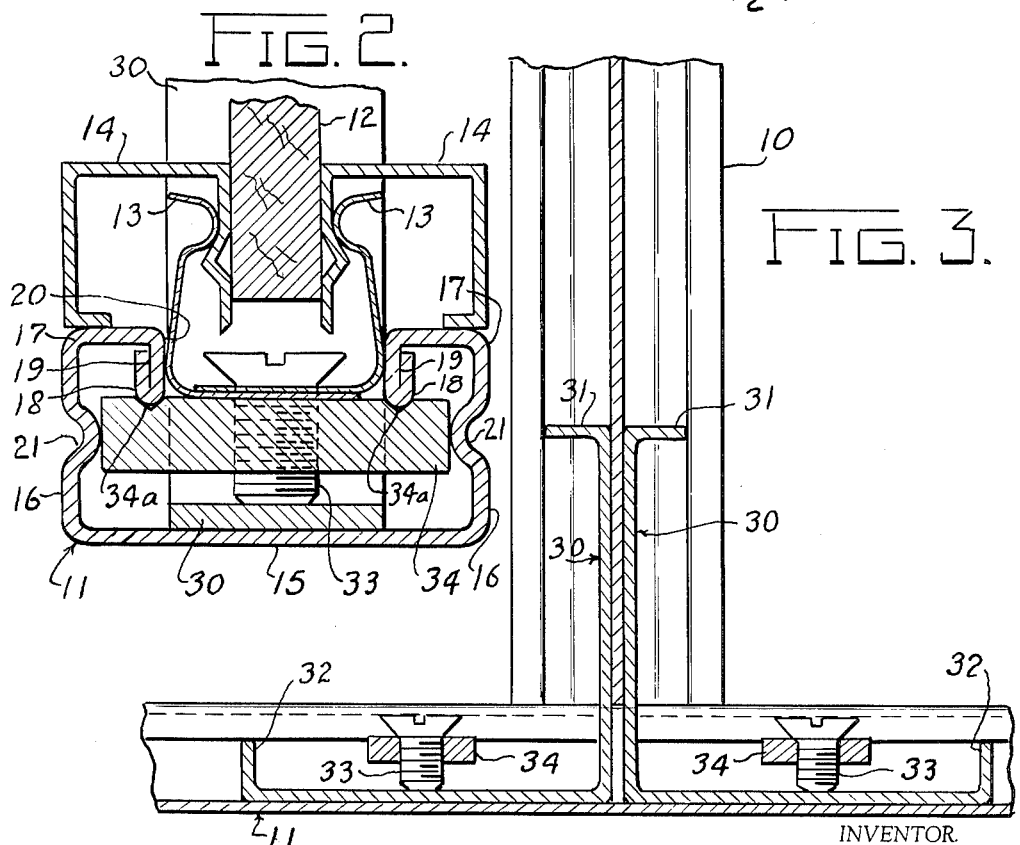
INVENTOR.
Leonard O. Downes
BY
ATTORNEYS

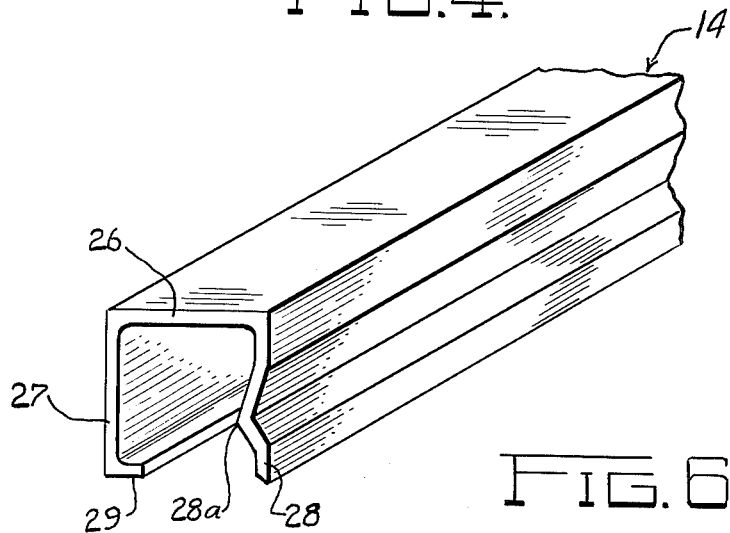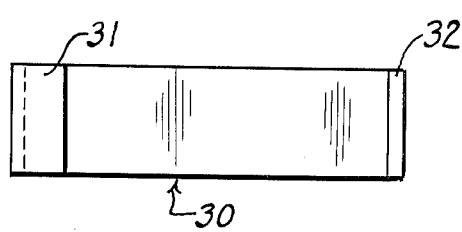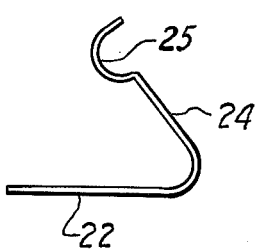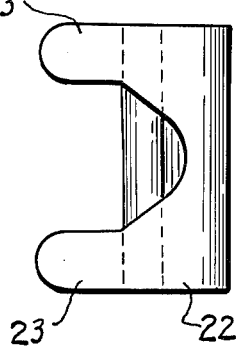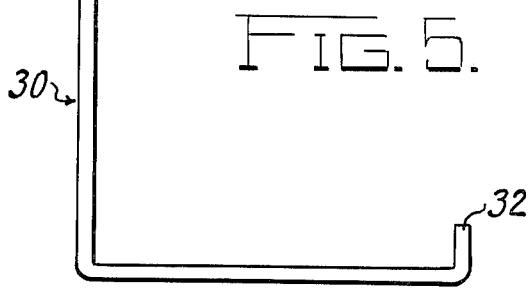

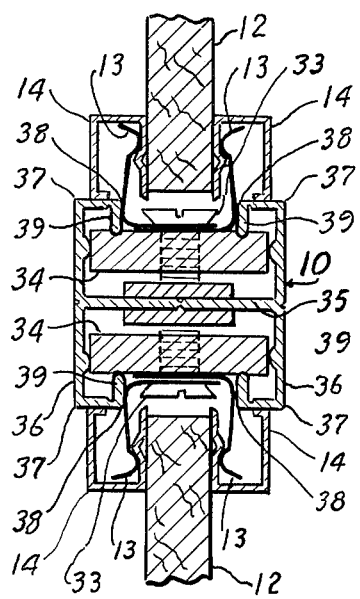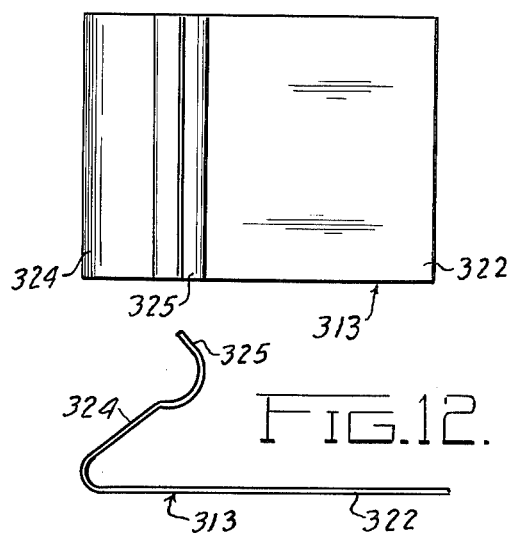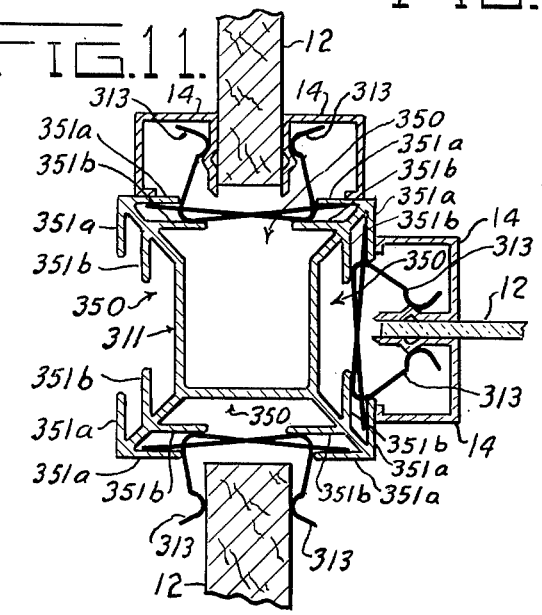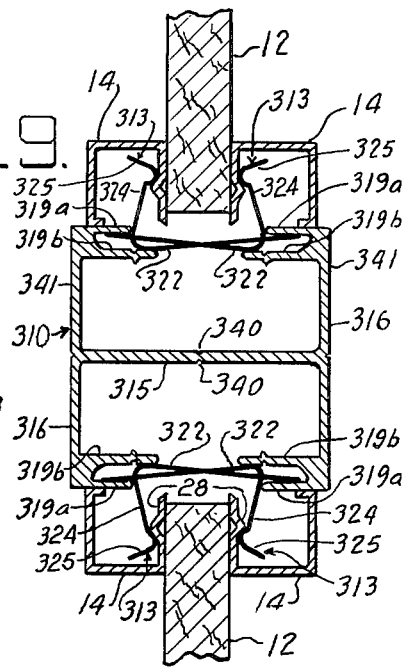

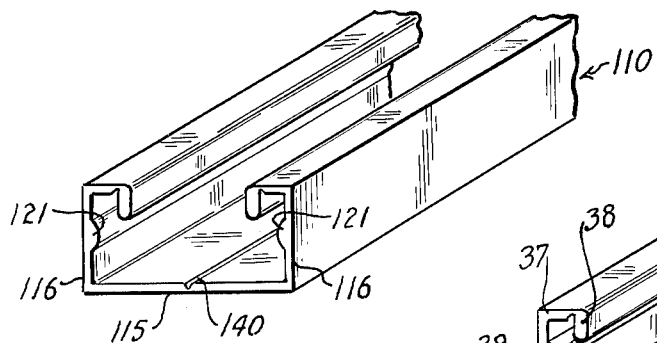
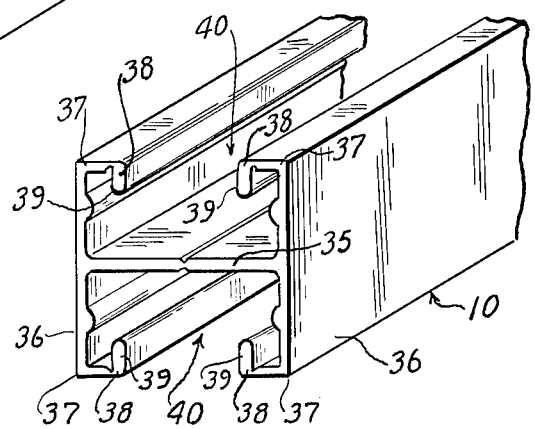
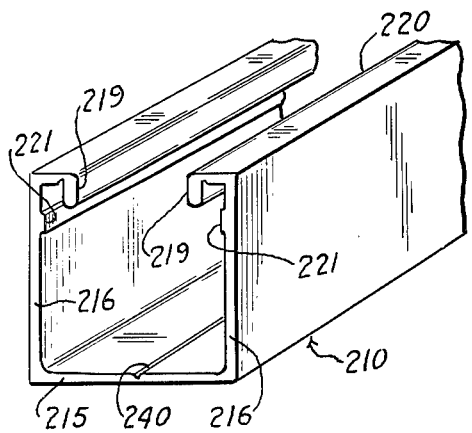
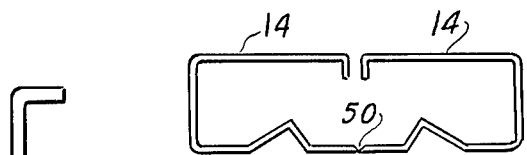

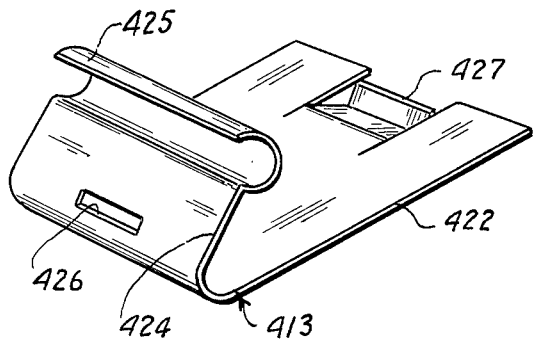
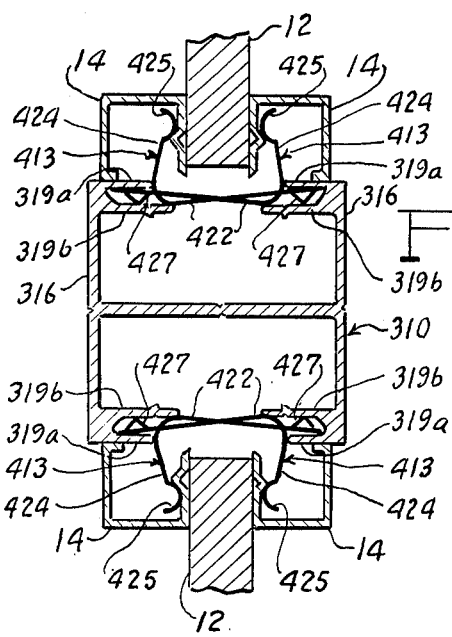

United States Patent Office 3,256,668
Patented June 21, 1966

1

3,256,668
PARTITIONS WITH PANELS SECURED TO FRAMING MEMBERS BY RESILIENT CLIPS
Leonard O. Downes, 4077 2nd St., Wayne, Mich.
Filed Oct. 1, 1962, Ser. No. 227,371
3 Claims. (Cl. 52—498)

The present invention relates to a new partitioning system and more particularly to such a system of readily assembled cooperating support structures for supporting and retaining panels of a variety of thicknesses and materials disposed in the open spaces formed by a unique framing structure.

Heretofore in the development of partitioning systems various limitations and disadvantages have been found to exist preventing a single system from serving many uses or being architecturally acceptable apart from specific installations.

Architecturally, panelling systems now in use, unless custom made, are generally unsatisfactory for most interiors since they lack the clean modern lines, finished joints and edges, and have various exposed brackets and miscellaneous connecting elements, screws, bolts and the like. Moreover, for practical reasons, most systems are unsatisfactory because they require skilled workmen and the use of many tools, are not readily dismounted or altered when desired and are not easily maintained.

An object of the present invention is to improve partition systems by combining new extrusion and connecting members permitting free and unobstructed assembly with new panel support members.

Another object of the invention is to facilitate partitioning by assembling new framing and supporting elements enabling the installation of a variety of panel configurations.

A further object of the invention is to provide architecturally acceptable interior partitioning by constructing new and readily connected framing and support elements operable to conceal all connections.

Yet another object of the present invention is to expand the versatility of partition systems by providing improved framing and support elements adaptable for partitioning with uniformity of appearance.

A still further object of the present invention is to facilitate partition construction by providing new elements readily assembled with a minimum of tools.

Further objects and advantages will be readily apparent to one skilled in the art to which the invention pertains upon reference to the following drawings in which like reference characters refer to like parts throughout the several views and in which FIG. 1 is a fragmentary elevational view of a partition assembly constructed according to a preferred embodiment of the present invention.

FIG. 2 is a cross sectional view taken substantially on line 2—2 of FIG. 1.

FIG. 3 is a cross sectional view of a preferred abutting means of the present invention.

FIG. 4 is a perspective view of a molding member used in the assembly illustrated in FIGS. 1–3.

FIGS. 5 and 6 are elevational side and top views respectively of a corner support member of the present invention.

FIGS. 7 and 8 are elevational bottom and side views respectively of a clip element of the present invention.

FIG. 9 is a cross sectional view of another preferred embodiment of the present invention.

FIG. 10 is a cross sectional view taken substantially on line 10—10 of FIG. 1.

FIG. 11 is a fragmentary cross sectional view of a partition assembly juncture of the present invention.

2

FIGS. 12 and 13 are elevational side and top views respectively of a clip element used in the assemblies of FIGS. 9 and 11.

FIG. 14 is a perspective view of a preferred extruded framing member of the present invention.

FIG. 15 is a perspective view of another preferred extruded framing member of the present invention.

FIG. 16 is a perspective view of yet another preferred extruded member of the present invention.

FIG. 17 and FIG. 18 are elevational side and top views respectively of another preferred corner support member of the present invention, FIG. 19 is an end elevational view illustrating a preferred method of producing the molding members of the present invention, FIG. 20 is a cross sectional view of yet another preferred embodiment of the present invention, and FIG. 21 is a perspective view of a clip element used in the assembly of FIG. 20.

Some of the structural framing members adapted for use in the present partitioning system, as new articles of manufacture, are more fully shown and described in my copending application Ser. No. 201,032, filed June 8, 1962 and now abandoned.

The basic framing system utilizing the framing members described in said application Ser. No. 201,032, now abandoned is more fully disclosed in my copending application Serial No. 201,021, filed June 8, 1962.

Other partitioning systems readily combined with and architecturally and visually compatible with the present system are more fully disclosed in my copending applications Ser. Nos. 201,024, filed June 8, 1962 and Serial No. 201,019, filed June 8, 1962, now Patent No. 3,193,061.

Door framing structure for use with the partition system of the present invention and those of my aforementioned copending applications is described in my copending application Ser. No. 222,296, filed September 10, 1962 and now abandoned.

My copending applications Ser. No. 227,370 and 222,294, now Patent No. 3,166,285, filed October 1, 1962 and September 10, 1962 respectively disclose and claim electrical fixture and shelf bracket assemblies adapted for use in the present and other compatible partitioning systems.

Now referring to the drawings for a more detailed description of the present invention, FIG. 1 illustrates a preferred floor to ceiling wall panel assembly comprising vertical and horizontal framing members 10 and 11 respectively supporting partitions 12 of any preferred material by means of clips 13 and molding members 14 as can best be seen in FIG. 2.

The horizontal framing member 11 is illustrated in FIG. 2 as comprising a longitudinal web portion 15 having longitudinal leg portions 16 extending from each side thereof. The leg portions 16 are each bent as at 17 and return bent as at 18 to form parallel longitudinally extending flanges 19 defining a longitudinal central recess 20. The leg portions 16 are each provided with an inwardly projecting medial portion 21.

The clip 13 as shown in FIGS. 7 and 8 is preferably stamped from a plate of spring steel and comprises a flat base strip 22 having a pair of substantially coplanar legs 23 extending from one edge of and substantially coplanar with the base strip 22. An arm portion 24 is bent upwardly from the opposite edge of the base strip 22 and terminates in a C-shaped portion 25 as shown.

The molding member 14 is shown in perspective in FIG. 4 as comprising an elongated substantially C shaped extruded member having a web portion 26 and substantially parallel legs 27–28. The leg 27 terminates in an inturned flange 29 and the leg 28 is provided with a longitudinally extending inwardly projecting medial ridge 28A.

An angle bracket 30 is illustrated in FIGS. 5–6 as being substantially L shaped and having flanges 31–32 at its free ends.

As can best be seen in FIGS. 2 and 3 the angle bracket 30 is of a width which permits it to be carried in the longitudinal recesses of abutting framing members 10–11. A screw 33 and a nut 34 having parallel recesses 34a spaced to seat in the flanges 19 of the framing members 10–11 are positioned in the recesses 20 and tightened. The screw 33 is of a sufficient length to bear against the angle member 30 to retain it in the recesses 20 of the framing member 10. One of the clips 13 is then inserted between the head of the screw 33 and the nut 34 as shown with the leg 23 of the clip separated by the shank of the screw 33. The panel or partition 12 is then positioned engaging the arm portion 24 of the clip 13, another clip 13 is inserted in place and the molding members 14 are snapped into place as can be seen in FIG. 2. It is apparent that since the clips 13 are resilient, panels 12 of various thicknesses can be supported.

FIGS. 10 and 15 illustrate the vertical framing member 10 as preferably comprising an H-shaped extruded member having a medial web portion 35 and a pair of substantially parallel legs 36. The legs 36 are bent as at 37 and 38 to form flanges 39 which define longitudinal central recesses 40. Panels 12 are carried in each of the recesses 40 by means of clips 13, molding members 14, screws 33 and nuts 34 substantially as described above.

Although particular framing members 10–11 have been described, it is apparent that other framing members as well can be used. All that is necessary is that a longitudinal recess having a flange at each side be provided. Also although the framing member 10 is shown in FIG. 2 as being formed, an extruded member can be used in its place. Such an extruded framing member 110 is illustrated in FIG. 14. FIG. 16 illustrates an extruded framing member 210 constructed substantially similar to framing members 10 and 110 but having a deeper central recess 220 than these members.

FIGS. 17 and 18 illustrate an angle bracket 230 suitable for use with the framing member 210. The angle bracket 230 is provided with a flange 232 which will extend to a position intermediate the flanges 219 of the framing member 210 when in use. Inwardly projecting ribs 121 and 221 are provided on the legs 116 and 216 of the framing member 110 and 210 respectively to position the nut 34. Marking grooves 140 and 240 are preferably provided on the web portions 115 and 215 of the framing members 110 and 210 respectively to facilitate the location of any holes which have to be drilled.

FIGS. 9 and 11–13 illustrate another preferred embodiment of the present invention. A preferred framing member 310 is illustrated in FIG. 9 as being H-shaped in section and comprising a medial web 315 with oppositely extending legs 316 whose outer surfaces form two opposite unrecessed faces 341. The end of each leg 316 is provided with two spaced longitudinal flanges 319a and 319b which extend in common planes toward the flanges of adjacent legs 316. Marking grooves 340 are preferably provided on opposite sides of the web 315. This particular framing member 310 has been more fully disclosed in my copending application Serial No. 201,032, filed June 8, 1962, and now abandoned and it will be readily apparent that other framing members described therein can be used for the purposes of the present invention.

A clip 313 is shown in FIGS. 12 and 13 as comprising a base strip 322 having an arm portion 324 extending upwardly from one edge thereof and terminating in a C-shaped portion 325. The clip 313 is preferably stamped from a plate of spring steel.

As can best be seen in FIG. 9, the base strip 322 of the clips 313 are of a sufficient width to extend between the flanges 319a and 319b of one leg 316 of the framing member 310 as the arm portion 324 bears against the flange 319a and the edge of the base strip 322 having the arm portion 324 rests upon the flange 319b of the adjacent leg 316. One of the clips 313 is positioned in the recess of the framing member 310 in this manner. The panel 12 is then positioned and a second clip 313 is inserted into place. The molding members 14 are then snapped into position with the leg 28 inserted between the clips 313 and the panel 12 and the flange 29 resting on the framing member 310.

FIG. 20 illustrates yet another preferred embodiment of the present invention. A clip 413 as shown in FIG. 21 comprises a base strip 422 having an arm portion 424 extending upwardly from one edge thereof and terminating in a C-shaped portion 425. An elongated slot 426 is provided in the arm portion 424 and a portion of the base strip 422 is cut and bent downwardly and return bent as shown to form a V-shaped spring portion 427. The clip 413 is preferably stamped and formed from a plate of spring steel.

As can best be seen in FIG. 20, the base strips 422 of the clips 413 are of sufficient width to extend between the flanges 319a and 319b of one leg 316 of the framing member 310 as the arm portion 424 bears against the flange 319a and the edge of the base strip 422 rests upon the flange 319b of the adjacent leg 316. The spring portion 427 bears against the flange 319b and urges the base strip 422 to bear against the flange 319a. This retains the clip member 413 in position while the panel 12 is positioned. After the panel 12 has been positioned, a second clip member 413 is inserted and the molding members 14 are snapped into position. The slot 426 provides the means by which a tool such as a screwdriver or the like can be used to help insert or remove the clip members 413.

FIG. 11 illutsrates the juncture of multiple panel partition assemblies utilizing panels 12 of various thicknesses. The framing member 311 which also has been more fully disclosed in my copending application Serial No. 201,032, now abandoned, preferably has four flat sides each having a longitudinal recess 350.

FIG. 19 illustrates a method of producing a pair of molding members 14 either by extruding or forming. The molding members 14 are produced in pairs separated by a breaking groove 50.

It is apparent that the angle brackets 30 and 230 can be used with the preferred embodiment illustrated in FIGS. 9, and 11–13 to produce a secure corner.

The particular advantage of the systems which have been described is that with only a relatively few parts, a great variety of architecturally desirable partition combinations are available and the essence of the inventions in all my copending applications is in the way in which the unique framing members, clips and molding members combine and coact to support wide varieties of single and double panels, all of which are assembled with a minimum amount of fastening devices so that changes and disassembly is more readily achieved.

Although I have described several preferred embodiments of the present invention, it will be apparent to one skilled in the art to which the invention pertains that other modifications can be made without departing from the spirit of the invention and the scope of the appended claims.

I claim:
1. In a partition system
 (a) a longitudinal framing member having at least one flat side provided with a longitudinal medial recess,
 (b) said framing member having a first pair of flanges extending toward one another one surface of which forms said flat side and being spaced apart to define a longitudinally extending entrance to said recess,
 (c) said framing member further having a second pair of flanges extending toward one another within said recess and positioned beneath said first pair of flanges to form spaces therebetween, said second pair of flanges being spaced apart from each other, (d) a panel member positioned in a plane substantially normal to the plane of said flat side and having an edge portion disposed adjacent said entrance to said recess, (e) a pair of substantially identical resilient clip elements each having a base portion extending between said spaced flanges with opposite end portions disposed within said spaces between said flanges on opposite sides of said recess and a clamping portion extending outwardly from said recess and through said entrance to resiliently engage said panel, one of said clamping portions being on each side of said panel clamping said panel intermediate said clip elements and to said framing member, (f) said clamping portions each comprising an extension of said base portion formed at an angle thereto, one of said end portions engaging the innermost surface of one of said first pair of flanges and the opposite end portion engaging the outermost surface of the flange of said pair of innermost flanges disposed on the opposite side of said recess.

2. The system as defined in claim 1 and including a longitudinally extending molding member disposed on each side of said panel, each of said molding members having an edge portion positioned intermediate said clamping portions of said clip elements and said panel whereby said clip elements clamp said molding members against said panel.

3. The partition system as defined in claim 1 and in which (a) said second pair of flanges are spaced from one another a lesser distance than said first pair of flanges, (b) the end of said base portion of said clip elements provided with said clamping portion being seated on the outermost surface of one of said second pair of flanges and the free end of said base portion extending into said space between said flanges on the opposite side of said recess.

References Cited by the Examiner

UNITED STATES PATENTS

| 1,219,208 | 3/1917 | Zahner et al. | 52—238 |
|---|---|---|---|
| 2,054,189 | 9/1936 | Bemis | 52—287 |
| 2,882,561 | 4/1959 | Shrode | 52—502 |
| 2,918,153 | 12/1959 | Hammitt et al. | 189—36 |
| 3,031,047 | 4/1962 | Williams | 189—36 |
| 3,125,191 | 3/1964 | Singer et al. | 52—498 |

FOREIGN PATENTS

| 483,768 | 6/1952 | Canada. |
|---|---|---|

FRANK L. ABBOTT, *Primary Examiner.*

RICHARD W. COOKE, Jr., *Examiner.*

L. R. RADANOVIC, *Assistant Examiner.*